(12) United States Patent
Mangold

(10) Patent No.: US 6,611,402 B1
(45) Date of Patent: Aug. 26, 2003

(54) PITCH-ADJUSTABLE HEAD SUSPENSION WITH END LIFT TAB FOR DYNAMIC LOAD/UNLOAD

(75) Inventor: Markus Erwin Mangold, Eden Prairie, MN (US)

(73) Assignee: Seagate Technology LLC, Scotts Valley, CA (US)

(*) Notice: Subject to any disclaimer, the term of this patent is extended or adjusted under 35 U.S.C. 154(b) by 53 days.

(21) Appl. No.: 09/590,442

(22) Filed: Jun. 9, 2000

Related U.S. Application Data

(60) Provisional application No. 60/138,212, filed on Jun. 9, 1999.

(51) Int. Cl.[7] .................................................. G11B 5/48
(52) U.S. Cl. ........................................ 360/255; 360/245.7
(58) Field of Search ........................ 360/254.7, 254.8, 360/254.9, 255, 254.6, 245.7, 245.3, 245

(56) References Cited

U.S. PATENT DOCUMENTS

| | | | |
|---|---|---|---|
| 5,027,241 A | | 6/1991 | Hatch et al. ............... 360/105 |
| 5,237,472 A | | 8/1993 | Morehouse et al. ........ 360/105 |
| 5,289,325 A | | 2/1994 | Morehouse et al. ........ 360/105 |
| 5,333,085 A | * | 7/1994 | Prentice et al. ........... 360/245.7 |
| 5,526,206 A | | 6/1996 | Shimizu .................... 360/105 |
| 5,623,758 A | | 4/1997 | Brooks, Jr. et al. ...... 29/603.01 |
| 5,638,234 A | * | 6/1997 | Hagen ...................... 360/245.5 |
| 6,638,234 | | 6/1997 | Hagen ...................... 360/104 |
| 5,771,136 A | * | 6/1998 | Girard ...................... 360/245.7 |
| 5,864,448 A | | 1/1999 | Berberich ................. 360/105 |
| 5,877,920 A | * | 3/1999 | Resh ........................ 360/245.7 |
| 5,986,853 A | * | 11/1999 | Simmons et al. ......... 360/245.9 |
| 6,055,132 A | * | 4/2000 | Arya et al. ............... 360/245.9 |
| 6,067,209 A | * | 5/2000 | Aoyagi et al. ............ 360/245.3 |
| 6,137,657 A | * | 10/2000 | Coon et al. ............... 360/245.7 |
| 6,157,520 A | * | 12/2000 | Mangold et al. .......... 360/245.3 |
| 6,172,853 B1 | * | 1/2001 | Davis et al. .............. 360/245.7 |
| 6,191,915 B1 | * | 2/2001 | Takagi et al. ............. 360/245.7 |
| 6,195,237 B1 | * | 2/2001 | Perez ........................ 360/245.7 |
| 6,201,666 B1 | | 3/2001 | Resh ......................... 360/55.9 |
| 6,226,154 B1 | * | 5/2001 | Albrecht .................... 360/254.7 |
| 6,243,235 B1 | * | 6/2001 | Fu et al. .................... 360/234.5 |
| 6,266,212 B1 | * | 7/2001 | Coon ......................... 360/234.5 |
| 6,320,729 B1 | * | 11/2001 | Coon ......................... 360/245.7 |
| 6,327,118 B1 | * | 12/2001 | Perez ........................ 360/245.7 |
| 6,424,498 B1 | * | 7/2002 | Patterson et al. .......... 360/245.7 |

* cited by examiner

*Primary Examiner*—Brian E. Miller
(74) *Attorney, Agent, or Firm*—Westman, Champlin & Kelly, P.A.

(57) ABSTRACT

A head suspension for mounting a head assembly in a disc drive that utilizes dynamic loading and unloading of the head assemblies. The head suspension includes a ramp contact feature that is located at the distal end of the head suspension and is substantially laterally centered on the head assembly, in order to minimize induced attitude moments at the time of loading and unloading of the head assemblies. The head suspension also provides selectable vertical separation between the ramp contact feature and the associated disc surface, in order to allow design flexibility. The head suspension also includes displacement limiting features which prevent plastic deformation of the gimbal during head lifting, and which contribute to positive pitch attitude during head unloading, to minimize the amount of disc surface which must be reserved for head unloading.

8 Claims, 5 Drawing Sheets

PITCH-ADJUSTABLE HEAD SUSPENSION WITH END LIFT TAB FOR DYNAMIC LOAD/UNLOAD

CROSS REFERENCE TO RELATED APPLICATION

This Application claims the benefit of U.S. Provisional Application Ser. No. 60/138,212, filed Jun. 9, 1999.

BACKGROUND OF THE INVENTION

This application relates generally to the field of rigid magnetic disc drive data storage devices, and more particularly, by not by way of limitation, to a head suspension which allows adjustment of pitch attitude of an attached head assembly, and which includes an end lift tab, which, in cooperative engagement with an associated ramp structure, facilitates dynamic loading and unloading of the attached head assembly.

Disc drives of the type known as "Winchester" disc drives or rigid disc drives are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

The movement of the heads across the disc surfaces in disc drives utilizing voice coil actuator systems is typically under the control of closed loop servo systems. In a closed loop servo system, specific data patterns used to define the location of the heads relative to the disc surface are prerecorded on the discs during the disc drive manufacturing process. The servo system reads the previously recorded servo information from the servo portion of the discs, compares the actual position of the actuator over the disc surface to a desired position and generates a position error signal (PES) reflective of the difference between the actual and desired positions. The servo system then generates a position correction signal which is used to select the polarity and amplitude of current applied to the coil of the voice coil actuator to bring the actuator to the desired position. When the actuator is at the desired position, no PES is generated, and no current is applied to the coil. Any subsequent tendency of the actuator to move from the desired position is countered by the detection of a position error, and the generation of the appropriate position correction signal to the coil.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding operating mechanical shocks of 100 G or greater without becoming inoperable. Moreover, future disc drive products are being developed which must be capable of withstanding non-operating shocks of up to 1000 G without suffering fatal damage.

One of the undesirable possible consequences of mechanical shocks applied to a disc drive is the phenomenon commonly referred to in the industry as "head slap". This condition occurs when the applied mechanical shock is large enough to overcome the load force applied to the head assembly by the head suspension. Under such conditions, the head assembly lifts away from the disc surface, and when the shock event terminates, the head assembly moves back into contact with the disc in an uncontrolled manner, potentially causing damage to the head assembly, disc or both.

One common preventive measure used in the industry to prevent head slap is to use ramps closely adjacent the outer diameter of the discs to unload the heads from engagement with the discs when a non-operating condition, such as loss of disc drive power, is detected. Since the heads are no longer resting on the disc surface, applied mechanical shocks cannot cause uncontrolled contact between the heads and discs. Once proper operational conditions are restored, the head assemblies are reloaded into engagement with the discs for normal disc drive operation.

In order to ramp load/unload the head assemblies, the head suspensions which support the head assemblies must include some sort of ramp contact feature to cooperate with the ramps, and these ramp contact features can be divided into two general groups: 1) ramp contact features located adjacent the leading edge of the head assembly, i.e., between the actuator pivot point and the head assembly; and 2) ramp contact features located adjacent the trailing edge of the head assembly, i.e., at the far distal end of the head suspension.

Head suspensions that include ramp contact features from the first group have the advantages of low mass and inertia during actuator seeks, high modal frequencies, good operating shock characteristics and simple access to the bonding pads used for electrical connection of the head transducers. The prior art use of this type of ramp contact feature does, however, have the disadvantages of requiring a parabolic ramp surface to ensure point contact between the ramp surfaces and the ramp contact features and insufficient clearance between the ramp contact feature and the disc surface to allow for assembly tolerances in a multi-disc disc drive assembly. Ramp contact features of this first type are also frequently laterally offset from the centerline of the head assembly, and introduce undesirable roll moments in the head suspension at the time of loading and unloading.

Head suspension assemblies that include ramp contact features from the second group have the advantages of allowing for flexibility of design of the contact features to allow for sufficient spacing between the disc surface and the ramp contact features, and the capability of having the ramp contact feature located on the head suspension centerline to limit static attitude biases on the gimbal of the head suspension.

The ramp contact features of the prior art are typically formed as elements of the relatively robust rigid beam portion of the head suspension assembly. When contact is established between the ramp contact features on the rigid beam portion of the head suspension assembly and the ramp surfaces, the lifting force is thus not directly applied to the relatively flexible gimbal portion of the head suspension assembly to which the heads are attached. Therefore, the mass of the heads is solely supported by the gimbal portion of the head suspension assembly when the heads are unloaded from cooperative engagement with the discs.

Prior art heads commonly included slider bodies of a type known as "positive pressure air bearing sliders" (PPABS). Such PPABS heads included air bearing surfaces which interact with a thin layer of air dragged along by the spinning discs to generate a hydrodynamic lifting force which tended to separate the heads from the disc surface. This lifting tendency was counterbalanced by forming a spring portion of the head suspension assembly to generate a balancing "load force" in a direction opposite to the hydrodynamic lifting force. The "flying height" of the heads was thus determined by the relative strengths of the hydrodynamic lifting force and the head suspension load force.

Recent industry demands for increased areal density of the recorded data on discs have, in turn, required that the heads be flown in greater proximity to the disc surfaces, with heads of the current generation utilizing flying heights of 1.0 $\mu"$ (0.000001 inch) or less. With such small flying heights, manufacturing tolerances in the head suspension assemblies lead to increasing difficulties in balancing the hydrodynamic lifting force of the head slider with the load force of the head suspension assembly to the necessary tolerance levels.

The requirement of lowered flying heights with more stringent tolerance needs has lead to the development of a new type of slider body for mounting the transducers used to record and retrieve data on the disc surface. This new type of slider body includes "negative pressure air bearing surfaces" (NPABS). As the name suggests, NPABS sliders include features that not only generate a hydrodynamic lifting force at the air bearing surfaces, but also include specially configured features that generate balancing low pressure, or "negative pressure", areas which tend to draw the head closer to the disc. Proper design of the slider body thus permits implementation of heads in which the hydrodynamic lifting force is balanced against the negative pressure created by the air bearing configuration to create slider bodies which are "self-balancing" and fly with great stability at a desired flying height. Since the balance of upward and downward forces exerted on the head is a function of the more easily controlled dimensions and features of the slider body itself, rather than the slider body and spring portion of the head suspension, variation of flying height from head to head can also be maintained within the more stringent tolerance ranges.

Solving the problem of head flying height through the use of NPABS sliders does, however, create a new engineering challenge related to ramp unloading and loading of the heads.

Since NPABS heads exert a downward (i.e., toward the disc surface) force in operation, a correspondingly greater force must be exerted to lift the heads away from the discs during head unloading, leading to potentially fatal stressing of the delicate gimbal portion of the head suspension if the lifting is accomplished by contact between the ramps and the load beam portions of the head suspension assemblies.

This problem has lead to various forms of displacement limiters, which are essentially non-functional during normal disc drive operation, but which engage the delicate gimbal during unloading operations, to prevent plastic deformation of the gimbal due to the additional force needed to disengage NPABS head assemblies from operational engagement with the discs.

When evaluating the design of such displacement limiters, consideration must also be made of how quickly, in terms of radial head movement, the limiters engage. In order to minimize the amount of radial movement needed to engage the limiters as the ramp contact feature of the head suspension travels up an associated ramp, the limiters and gimbal features that interact should be closely spaced. However, the interacting elements cannot be overly close, or undesirable contact between them may occur during normal operation.

Furthermore, it is common in the industry to mechanically adjust the static roll and pitch attitudes of the head assembly after it has been attached to a complete head suspension assembly, and incorrect design of the limiting features can inhibit the ability to make such attitude adjustments.

It would also be desirable if the limiting features, upon engagement, tended to introduce a positive pitch attitude in the head assembly, i.e., leading edge up, in order to both break the negative air pressure which tends to attract the head assembly to the disc, and introduce increased hydrodynamic lift which will act in cooperation with the ramp contact to lift the head assembly out of engagement with the disc.

Finally, when considering the design of the ramp contact features of the head suspension, it is desirable to have a relatively large vertical separation between the ramp contact feature and the surface of the associated disc, in order to permit greater tolerance range in the fabrication of the cooperative ramp structure and in the tolerance build up of the disc stack elements, particularly in disc drives that incorporate large numbers of discs. A head suspension with selectable ramp contact feature/disc surface separation would, therefore, also be desirable.

The head suspension of the present invention provides all of the desirable features noted above, and is readily assembled in a high volume manufacturing environment.

SUMMARY OF THE INVENTION

The present invention is a head suspension for mounting a head assembly in a disc drive that utilizes dynamic loading and unloading of the head assemblies. The head suspension includes a ramp contact feature that is located at the distal end of the head suspension and is substantially laterally centered on the head assembly, in order to minimize induced attitude moments at the time of loading and unloading of the head assemblies. The head suspension also provides selectable vertical separation between the ramp contact feature and the associated disc surface, in order to allow design flexibility. The head suspension also includes displacement limiting features which prevent plastic deformation of the gimbal during head lifting, and which contribute to positive pitch attitude during head unloading, to minimize the amount of disc surface which must be reserved for head unloading.

The manner in which the present invention is implemented, as well as other features, benefits and advantages of the invention, can best be understood by a review of the following Detailed Description of the Invention, when read in conjunction with an examination of the accompanying drawings.

DETAILED DESCRIPTION OF THE INVENTION

Figure 1:
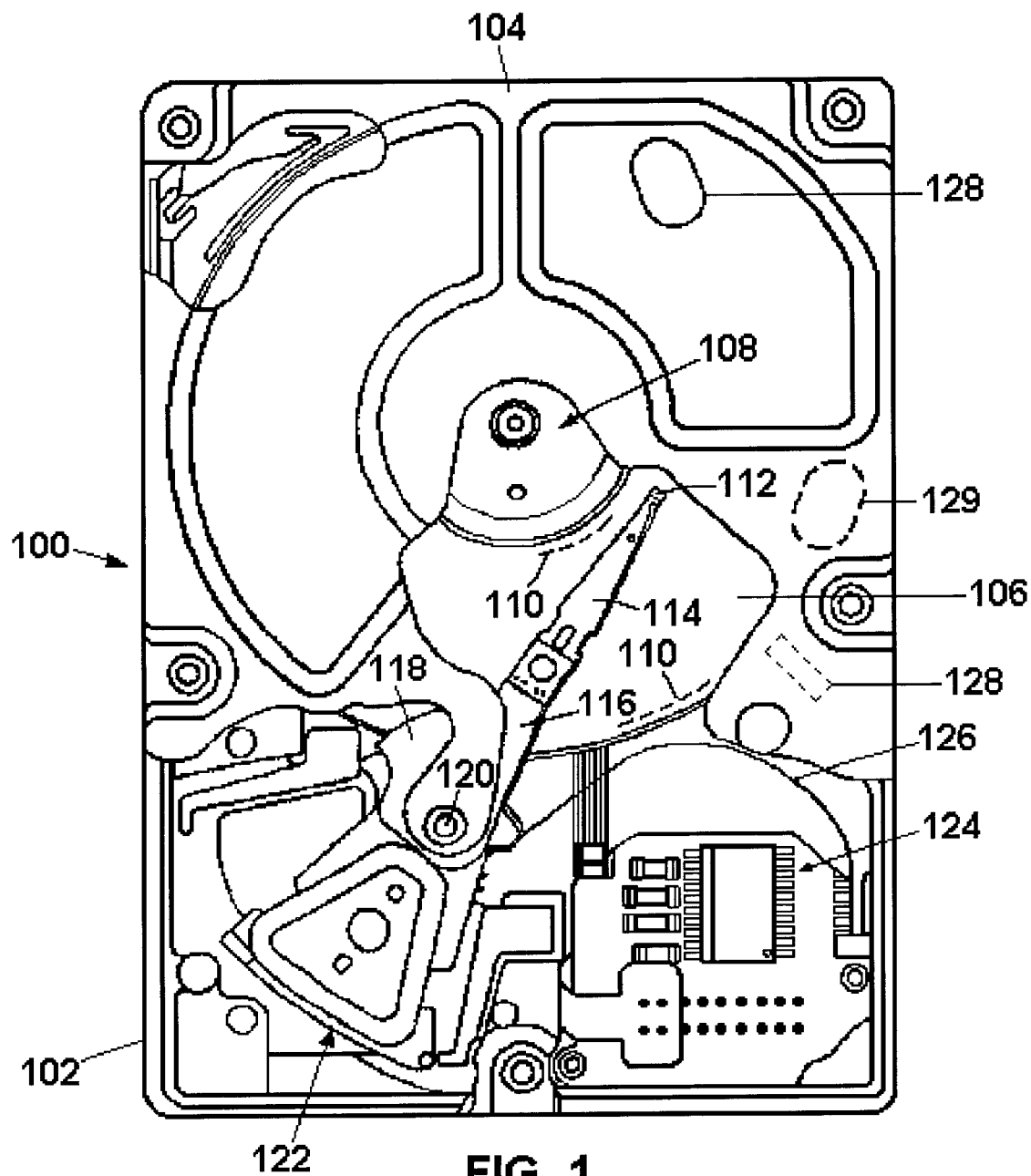
FIG. 1 is a top plan view of a disc drive with which the present invention is particularly useful.

Turning now to the drawings and specifically to FIG. 1, shown is a plan view of a disc drive 100 with which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

It is also a typical feature of disc drives to include a ramp structure, represented by dashed lines at 128, near the outer diameter of the discs 106. When non-operative conditions—such as loss of power or "sleep" conditions—are detected by the associated electronic circuitry, the actuator is moved clockwise until ramp contact features (not shown) on the head suspensions 114 interact with the ramp structure 128 to lift the head assemblies 112 out of cooperative engagement with the discs 106. The head assemblies 112 will remain in this "unloaded" condition until proper conditions for normal operation are detected, such as restoration of power or a "wake-up" operation.

When a return to normal operational conditions is detected, the spindle motor 108 is brought back up to nominal speed, and the acutator is used to move the head assemblies 112 off the ramp structure 128, and back into operational engagement with the spinning discs 106. Such movement of the head assemblies 112 into and out of cooperative engagement with spinning discs 106 is referred to as "dynamic loading/unloading" of the heads 112.

Systems of ramp structure and ramp contact features on head suspensions are described in co-pending U.S. patent applications Ser. No. (SEA 8599) and Ser. No. 09/280,299, filed Mar. 29, 1999, both assigned to the assignee of the present application, and incorporated herein as if included in their entireties.

Figure 2:
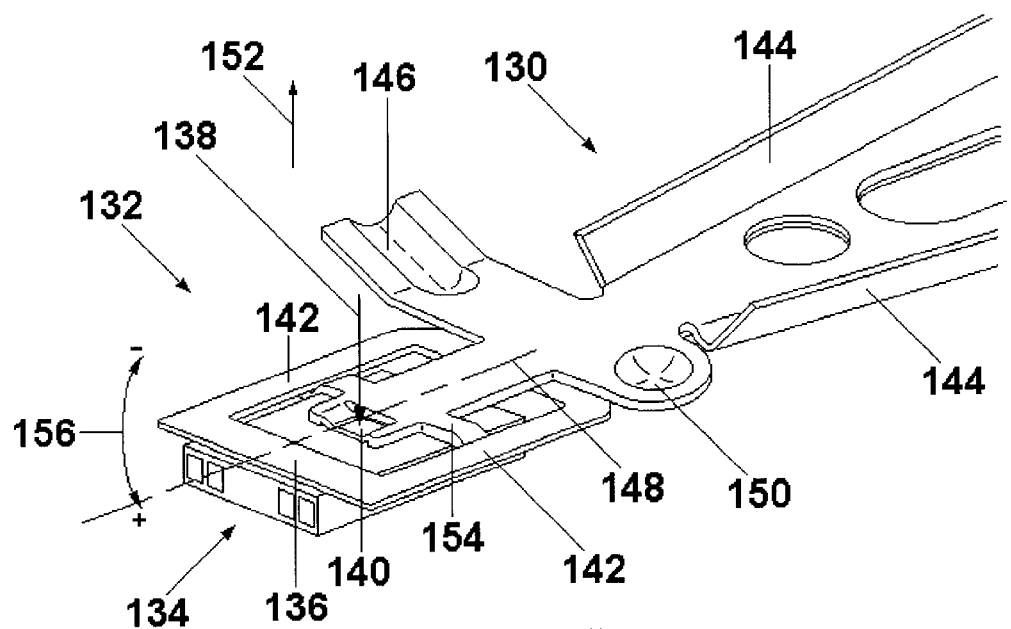
FIG. 2 is a perspective view of portions of a prior art head/head suspension assembly including ramp contact features for loading and unloading of the head, and displacement limiting features.

The first of these incorporated applications describe ramp contact features integral with the load beam portion of the head suspension, and is shown as prior art to the present application in FIG. 2, which will be utilized to discuss, in general terms, the elements necessary for dynamic loading/unloading of head assemblies.

FIG. 2 is a perspective view of portions of a head/head suspension assembly. The head suspension (not collectively designated) comprises a load beam portion, generally designated at 130, and a gimbal portion, generally designated at 132. A head assembly, generally designated at 134, is adhesively mounted to the gimbal portion 132 of the head suspension at a cross member 136, and a load force, generated by a spring portion (not shown) of the head suspension, is applied to the head assembly 134 at a substantially centered location, designated by arrow 138. Point contact for this load force application is provided by a load point protrusion structure, generally designated 140. An example of the formation and structure of this load point protrusion structure 140 is the subject of U.S. Pat. No.

5,638,234, issued Jun. 10, 1997 to Hagen, assigned to the assignee of the present application and incorporated herein by reference. In general, a localized area of the load beam 130 surrounding a desired location of a load point protrusion is half-etched, leaving the desired load point protrusion at the full thickness of the load beam material. Then the half-etched region is mechanically formed out-of-plane to cause the load point protrusion to extend beneath the remainder of the load beam portion lower surface.

The head suspension provides compliance in the roll and pitch axes of the head assembly 134 by the inclusion of a pair of laterally spaced gimbal beams 142. Additional stiffness for the load beam portion 130 is provided by the presence of folded side rails 144.

The load beam portion 130 also includes a primary ramp contact feature 146. Since the primary ramp contact feature 146 is laterally displaced from the longitudinal centerline 148 of the head suspension, contact between the primary ramp contact feature 146 and a ramp structure (not shown) tends to introduce a torque moment in the head suspension, and this tendency is countered by the inclusion of a secondary ramp contact feature 150 on the opposite lateral side of the load beam portion 130.

As contact between the primary ramp contact feature 146 and the ramp structure lifts the load beam portion 130 in the direction of arrow 152, there is a tendency for the gimbal portion 132 to bent away from its intended relationship with the load beam portion 130. This tendency is due, in part, to the typically rapid lifting of the load beam portion 130 and inertial effects, and is exacerbated by the inclusion of current technology negative pressure air bearing (NPAB) heads, which include features that produce low pressure regions which draw the head assembly 134 downward toward the associated disc surface. If bending of the gimbal beams 142 due to these effects is not limited, the relatively delicate gimbal beams 142 can be plastically deformed, undesirably altering the flying attitude of the head assembly. Therefore, the head suspension of FIG. 2 also includes lift displacement limiting features, one of which is designated 154. The lift displacement limiting features 154 extend laterally from the load beam portion 130 near the load point protrusion structure 140 over the upper surface of the head assembly 134, and are then bent to extend below the gimbal beams 142. Under normal operating conditions, there is no contact between the lift displacement limiting features 154 and the head assembly 134 or gimbal beams 142.

However, as the load beam 130 is lifted upward in the direction of arrow 152, any tendency of the gimbal beams 142 to bend downward away from the load beam portion 130 is countered by contact between the gimbal beams and the lift displacement limiting features 154, thus preventing permanent bending of the gimbal beams 142 and changes in the desired flying attitude of the head assembly 134.

While the head suspension of FIG. 2 is completely operative and possesses all of the advantages cited in the previously incorporated application, it does have some limitations:

Firstly, since the primary ramp contact feature 146 is laterally displaced from longitudinal centerline 148 of the head suspension and head assembly 134, a torque moment is applied to the head suspension at the time of contact between the primary ramp contact feature 146 and the ramp structure, as previously mentioned, and this torque moment will continue to be exerted until the secondary ramp contact feature 150 engages the ramp structure.

Secondly, as can be seen in the figure, in order to be effective, the primary and secondary ramp contact features 146, 150 must extend downward below the level of the gimbal portion 132. This brings them into a proximity to the associated disc surface provided only by the thickness of the head assembly 134. Such proximity is problematic, due to manufacturing tolerance limitations in the ramp structure, and tolerance buildup in the elements of the disc stack, especially in disc drives including large numbers of discs.

A third limitation in the prior art head suspension of FIG. 2 relates to static attitude adjustment of the gimbal portion 132.

In FIG. 2, pitch attitude variability is shown by arrow 156. Positive pitch attitude is defined as a "nose-up/tail-down" attitude in the head assembly 134 relative to the disc surface, and is thus noted by the "+" sign at the bottom of arrow 156, and negative pitch is the opposite, i.e., "nose-down/tail-up", as noted by the "−" sign at the top of arrow 156.

It is common practice in the industry to adjust the static pitch attitude of a completed head/head suspension assembly to control the dynamic pitch attitude that the head assembly 134 will assume when operatively engaged with a rotating disc. One of skill in the art will appreciate that, while the head suspension of FIG. 2 will allow such static pitch adjustment, its configuration introduces differences in positive and negative adjustments. That is, if negative pitch is to be increased, the gimbal beams 142 can be bent upward, and positive pitch can be introduced by bending the gimbal beams downward, as shown by arrow 156. However, when the gimbal beams are bent upward, the bending force will be applied to the entire length of the gimbal beams 142, while, when the bending force is exerted downward, contact between the gimbal beams 142 and the lift displacement limiting features 154 causes the bending to be applied only to those portions of the gimbal beams 142 distal to the lift displacement limiting features 154. Attempts to reimpose symmetry to the pitch adjustment operation by clamping the gimbal beams in their middle portions prior to adjustment are impeded by the presence of the lift displacement limiting features 154.

The head suspension of the present invention overcomes all of these limitations.

Figure 3:
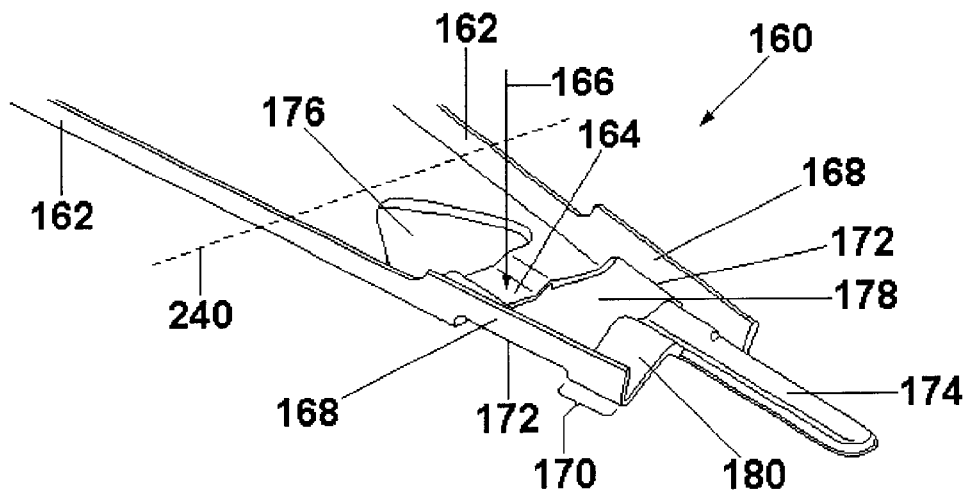
FIG. 3 is a perspective view of a portion of a load beam, which makes up a portion of the head suspension of the present invention.

Turning now to FIG. 3, shown is a perspective view of a portion of a load beam 160 which forms a portion of the head suspension of the present invention.

As can be seen in the figure, the load beam includes stiffening folded side rails 162 and a load point protrusion portion 164 for applying a load force at a localized position, represented by arrow 166, similar to those of the prior art head suspension of FIG. 2. The load point protrusion portion 164 is again envisioned to be formed in accordance with the previously incorporated '234 patent.

A first difference between the prior art head suspension of FIG. 2 and the load beam 160 of the present invention is that the side rails 162 extend to positions laterally opposite the load point protrusion portion 164, providing additional rigidity to this portion of the load beam 160.

The side rails 162 also extend upward and distally in the region opposite the load point protrusion portion 164 to form bridging rails 168 which connect, at their distal ends, to a lift feature mounting portion 170. It should be noted that the lower edges 172 of the bridging rails 168 are thus vertically displaced upward from the lower surface of the load beam 160. The lift feature mounting portion 170 connects to a ramp contact feature 174 in a manner to be discussed in more detail below.

The load beam 160 also includes a proximal opening 176 and a distal opening 178 on the proximal and distal sides, respectively, of the load point protrusion portion 164, which will interact with certain elements of the gimbal of the head suspension of the present invention in a manner to be discussed below.

The lift feature mounting portion 170 can be seen to include connecting elements, one of which is designated 180, which lie between the far distal ends of the bridging rails 168 and the ramp contact feature 174. The ramp contact feature 174 itself is stampformed into a partially cylindrical shape with a rounded end, as can be seen in the figure, thus ensuring that no sharp edges of the ramp contact feature 174 will meet with any portion of an associated ramp structure.

The connecting elements 180 are bent vertically upward and extend laterally to position the ramp contact feature at a location which is laterally centered on the load beam 160, and vertically disposed above the lowermost surface of the load beam 160. Thus, the vertical location of the ramp contact feature 174 can be selected by controlling the extent to which the connecting elements 180 are bent upwards. This selection allows optimization of the dynamic loading and unloading elements of the disc drive, and can be decreased to allow for small disc-to-disc spacing, or increased to compensate for large amounts of tolerance build-up. Such optimization would not be possible with head suspensions of the prior art. This feature of the head suspension of the present invention will be discussed further below.

Figure 4:
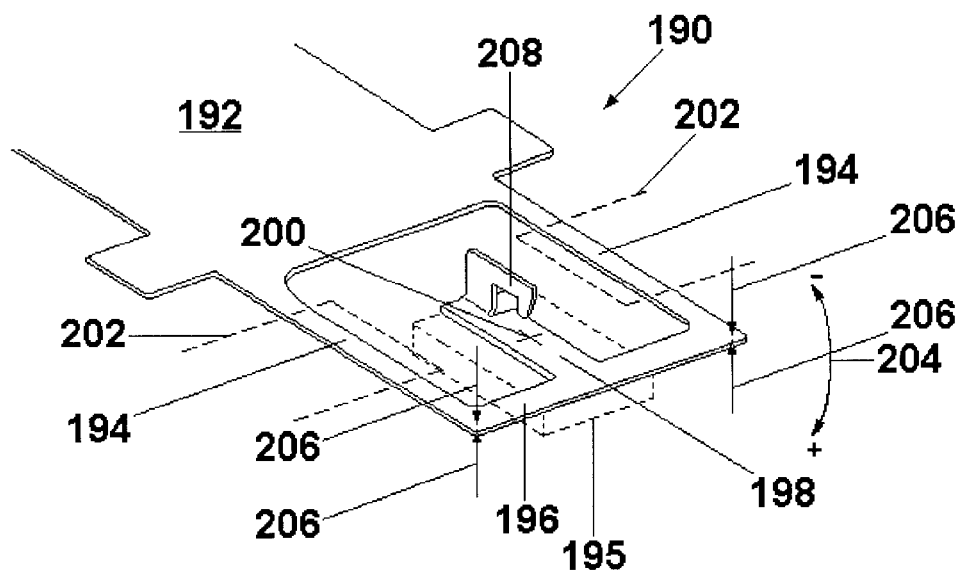
FIG. 4 is a perspective view of a portion of a gimbal, which makes up a portion of the head suspension of the present invention.

Turning now to FIG. 4, shown is a perspective view of a portion of a gimbal member, generally designated 190, which forms a part of the present invention. As can be seen in the figure the gimbal member 190 includes a mounting portion 192 used to connect the gimbal member 190 to a load beam, such as that shown in FIG. 3, a pair of laterally displaced gimbal beams 194, to provide needed compliance in the roll and pitch axes of an attached head assembly (shown by dashed lines at 195), a connecting cross member 196 connecting the distal ends of the gimbal beams 194, and a proximally extending central tongue element 198 (also referred to as a slider bond pad), to the lower surface of which a head assembly 195 is typically adhesively attached. The central tongue element 198 includes a load force application point, generally designated at 200, at which point an associated load beam, such as the load beam 160 of FIG. 3, applies a downward force to counterbalance any hydrodynamic lifting force generated by the head assembly 195 and an associated rotating disc (106 in FIG. 1). All elements of the gimbal member 190 described to this point are similar in form and function to comparable elements of prior art head suspensions.

The present invention envisions that pitch static attitude adjustment of the gimbal member 190 can be accomplished by first clamping the gimbal beams 194 in the regions designated generally by dashed lines at 202, and bending the free ends of the gimbal beams 194 in the directions referenced by arrow 204, i.e., downward for increased positive pitch static attitude, or upward for increased negative pitch static attitude. The bending necessary for pitch static attitude adjustment is envisioned to be accomplished by application of force in the desired direction to the distal ends of the gimbal beams 194, as represented by arrows 206. Of course, the clamping and bending of the gimbal beams 194 to perform pitch static attitude adjustment is shown in FIG. 4 for reference purposes only, and one of skill in the art will readily understand that such pitch static adjustment must be performed only after the gimbal member 190 is attached to a load beam, such as load beam 160 of FIG. 3, and a head assembly 195 is attached.

FIG. 4 also shows that the gimbal member 190 is envisioned to include a lift displacement limiting feature 208 formed at the free end of the central tongue element 198. The lift displacement limiting feature 208 would be formed integrally from the sheet material of the gimbal member 190 using the well known masking and etching processes currently used to form gimbal members, and is then formed upward at substantially 90 degrees from the plane of the rest of the gimbal member elements. The actual contact point (not separately designated) of the lift displacement limiting feature 208 is also substantially laterally centered on the gimbal member 190.

The manner in which the lift displacement limiting feature 208 interacts with other elements of the head suspension of the present invention will be discussed in detail hereinbelow.

Figure 5:
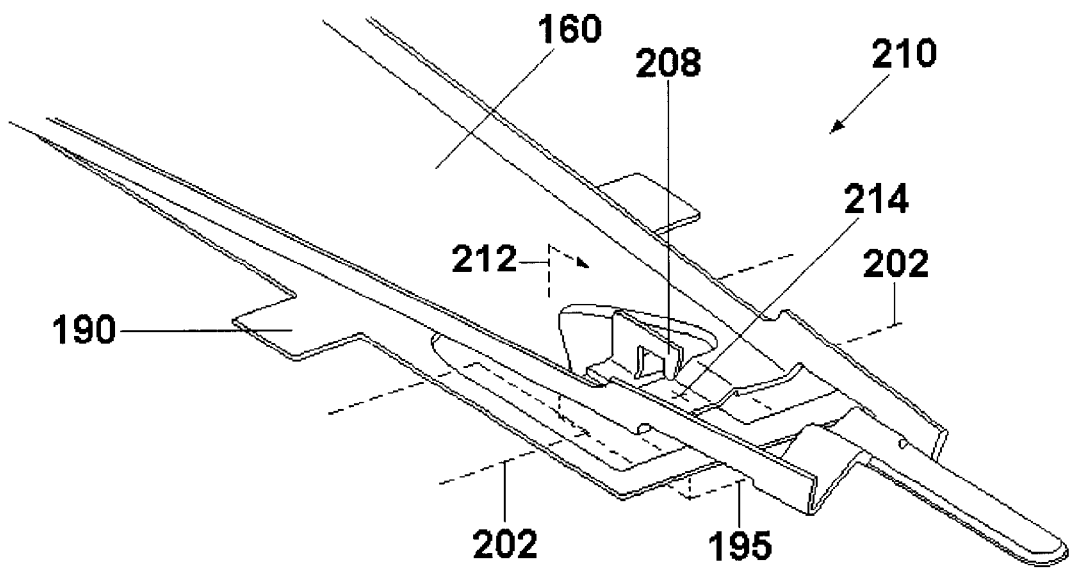
FIG. 5 is a perspective view of the load beam of FIG. 3 and gimbal of FIG. 4, assembled together to form the head suspension of the present invention.

FIG. 5 is a perspective view of a portion of a head suspension 210 made in accordance with the present invention. As the figure shows, the head suspension includes a load beam 160, such as that described in relationship to FIG. 3 above, and a gimbal member 190, such as that described in relationship to FIG. 4 above. FIG. 5 also shows the relative location of an attached head assembly by dashed lines at 195.

In order to attach the gimbal member 190 to the load beam 160, the lift displacement limiting feature 208 must first be inserted through the proximal opening (176 in FIG. 3) in the load beam 160, and then the gimbal 190 and load beam 160 shifted longitudinally relative to each other, as show by arrow 212. Once thus properly aligned, the mounting portion (192 in FIG. 4) of the gimbal member 190 can be fixedly attached to the load beam 160 using well known attachment processes, such as laser welding.

As is shown in the figure, when the load beam 160 and gimbal member 190 are assembled in their intended relationship, the lift displacement limiting feature 208 of the gimbal member 190 extends longitudinally over the load point protrusion portion (164 in FIG. 3), and into proximity with a point, designated with numerical reference 214, which is vertically aligned with the load force application point (200 in FIG. 4) on the gimbal member 190. The lift displacement limiting feature 208 is not in contact with any other elements of the head suspension 210, except the central tongue element (198 in FIG. 4) from which it projects, during normal operation. The effect of the lift displacement limiting feature during ramp loading/unloading of the head assembly 195 will be discussed in more detail hereinbelow.

Before turning away from FIG. 5, it is useful to examine several of the spatial relationships established when the gimbal 190 and load beam 160 are assembled in the intended manner.

First, it will be noted that the gimbal beams (194 in FIG. 4) extend laterally beyond the extent of the load beam 106. This allows the gimbal beams 194 to be clamped by an adjustment feature (not shown) in the area represented by dashed lines 202 to facilitate pitch static adjustment of the head suspension as previously described in the discussion of FIG. 4.

Secondly, the connecting cross member (196 in FIG. 4) at the distal ends of the gimbal beams 194 lies beneath the raised lower edges (172 in FIG. 3) of the bridging rails (168 in FIG. 3) of the load beam 160, and thus passes beneath the load beam 160 in the region of the distal opening (178 in FIG. 4) in the load beam 160. This spatial relationship allows greater freedom in establishing increased negative pitch static attitude than was possible with prior art head suspensions, as will also be discussed in greater detail hereinbelow.

Figure 6:
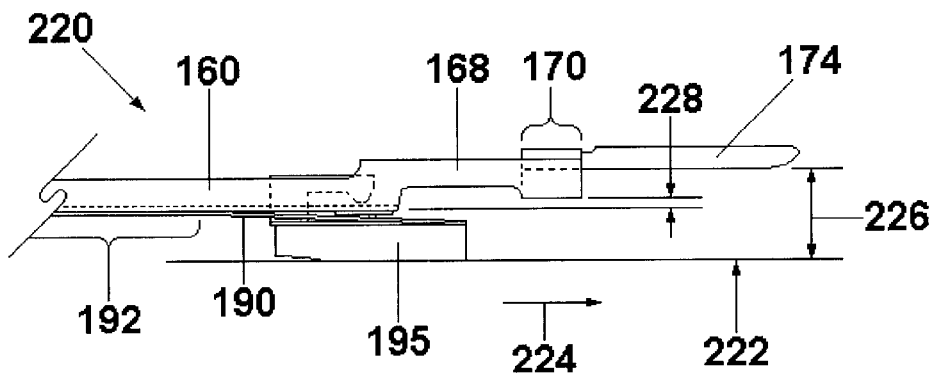
FIG. 6 is a side elevation view of portions of a head/head suspension assembly made in accordance with the present invention, as operatively engaged with the surface of a disc.

Turning now to FIG. 6, shown is a side elevation view of a head/head suspension assembly 220, made in accordance with the present invention and in operational engagement with a disc surface 222. The head/head suspension assembly 220 can be seen in the figure to comprise a load beam 160, such as that described in relationship to FIG. 3, a gimbal member 190, such as that described in relationship to FIG. 4 and a head assembly 195, which in turn includes a data transducer (not shown) for writing data to and retrieving data from the disc surface 222.

FIG. 6 also shows that the mounting portion 192 of the gimbal member 190 is fixedly attached to and substantially coplanar with the lower surface of the load beam 160, while the gimbal beams (194 in FIG. 4) are displaced out-of-plane from the mounting portion 192 by the actions of the load point protrusion portion (164 in FIG. 3), in a manner to be discussed in more detail hereinbelow.

Also shown in FIG. 6 is the lift feature mounting portion 170 and the lift feature 174, and FIG. 6 is particularly useful for a discussion of the relationship between the lift feature 174 and other elements of the head/head suspension assembly 220. The direction of disc rotation is shown by arrow 224, and the lift feature 174 can thus be seen to be located distally beyond the trailing edge of the head assembly 195.

One of the principal advantages of the head suspension of the present invention is the capability of selecting the amount of vertical separation, shown by arrow 226, between the lift feature 174 and the disc surface 222. By providing the ability to select this dimension, the present invention allows for optimization of the interaction between the ramp structure (not shown) and the lift feature 174. That is, separation between the lift feature 174 and the disc surface 222 can be selectively large enough to compensate for tolerance variations in the associated ramp structure, while still being made small enough to optimize inter-disc spacing, and thus allow for increased numbers of discs in a given physical envelope, or allow for smaller packaging dimensions.

The first related variables that the present invention allows to be selected are the height and direction of the first bend between the lift feature mounting portion 170 and the bridging rails 168. Returning momentarily to FIG. 3, in the example shown, this first bend is made at an acute angle, and thus causes the connecting elements 180 to extend laterally inward and upward from the first bend to the ramp contact feature 174. However, as will be apparent to one of skill in the art, this first bend can also be a right angle—placing the base of the ramp contact feature 174 at substantially the same height as the first bend—or an obtuse angle, positioning the base of the ramp contact feature at a height below the level of the first bend.

Returning now to FIG. 6, the example of the figure shows that the height of the first bend between the bridging rails 168 and the connecting elements (180 in FIG. 3) is selected to be above the height of the planar portion of the load beam 160, as represented by arrows at 228. However, one of skill in the art will realize that the vertical location of this first bend can also be readily modified to be at the same height or below the planar portion of the load beam 160.

Similarly, in another aspect of the present invention, it is apparent that with the configuration of the present invention, both the angle of this first bend, and the length of the connecting elements (180 in FIG. 3) can be selected to position the ramp contact feature 174 vertically relative to the first bend.

Figure 7A:
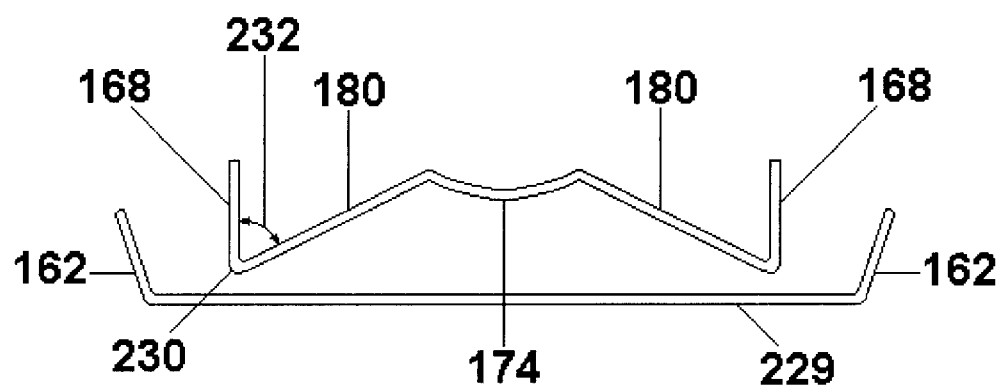
FIGS. 7A, 7B and 7C are detail lateral section views of a portion of the load beam of FIG. 3, showing several variations to which the present invention readily lends itself.
Figure 7B:
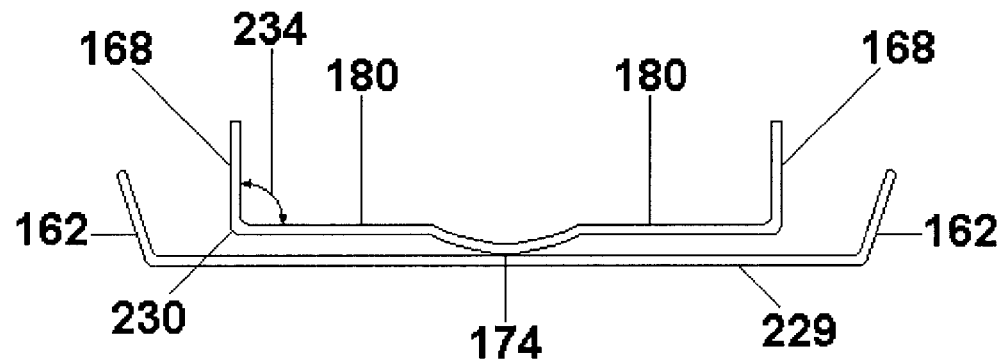
Figure 7C:
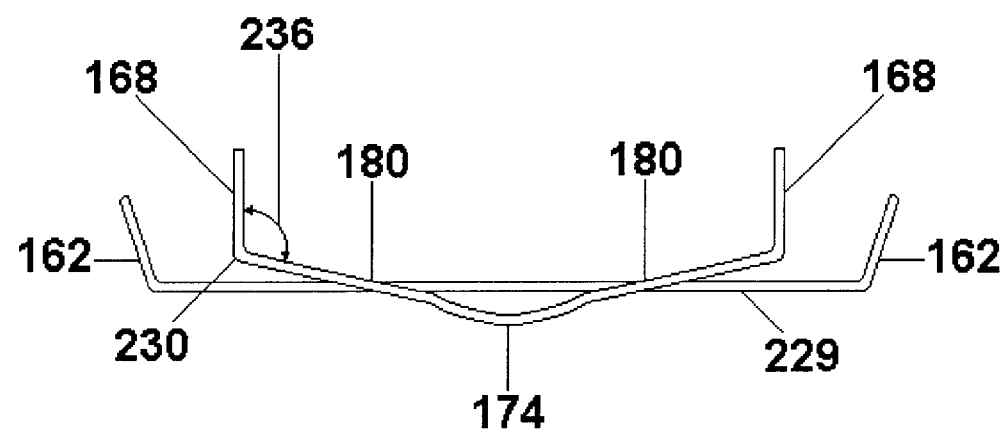

The flexibility of choice provided by this aspect of the invention is perhaps most readily seen in FIGS. 7A through 7C, which are detail, diagrammatic lateral sectional views taken through the lift feature mounting portion 170 of the load beam 160. FIGS. 7A through 7C also include a sectional view taken through the main beam portion of the load beam, at a location substantially shown by dashed line 240 in FIG. 3, to show the vertical spatial relationship between the lower surface of the ramp contact feature 174 and the lower surface 229 of the main beam portion of the load beam.

In FIG. 7A, the first bend 230 between the bridging rails 168 and the connecting elements 180 can be seen to be an acute angle 232. Forming the lift feature mounting portion in this manner places the ramp contact feature 174 above the vertical position of the first bend 230. It will also be readily apparent to one or skill in the art that, if the first bend 230 is only slightly less than 90 degrees, the lower surface of the ramp contact feature 174 can be positioned at the same height as the first bend 230.

The configuration of FIG. 7A also shows that the lower surface 229 of the main beam portion lies significantly below the lower surface of the ramp contact feature 174, and that the location of the first bend 230 is above the lower surface 229 of the main beam portion, as previously noted. It should be recalled that the vertical spacing between the lower surface 229 of the main beam portion and the first bend 230 is one of the design alternatives provided by the present invention, and, while FIGS. 7A through 7C show this relationship as a constant, the selectability of this relationship is just one of the factors contributing to the overall flexibility of design provided by the present invention.

FIG. 7B shows a second variation of the lift feature mounting portion of the load beam, in which the first bend 230 is a right angle 234, placing the lowermost surface below the level of the first bend 230 by a distance equal to the formed depth of the ramp contact feature 174 itself. Such a variation places the lower surface of the ramp contact feature 174 above the lower surface 229 of the main beam portion by substantially only the thickness of the load beam material. One of skill in the art will appreciate that the lower surface of the ramp contact feature can thus be brought into substantially any desired relationship with the lowermost point of the load point protrusion, and thus into any desired vertical relationship with the head assembly and disc surface.

Finally, FIG. 7C shows that the height of the ramp contact feature 174 can be positioned below the level of the first bend 230 by making the first bend 230 an obtuse angle 236. FIG. 7C also shows that the lower surface of the ramp contact feature 174 can be positioned below the lower surface 229 of the main beam portion of the load beam, should such a relationship be desired.

Thus, the present invention, by permitting selection of first the vertical position of the first bend 230 and second by permitting wide variation in the angle 232/234/236 of the first bend 230, allows great flexibility selecting the height 226 by which the ramp contact feature 174 is separated from the disc surface. As previously mentioned, this height 226 is preferably optimized to allow for tolerance variations in the associated ramp structure and optimum inter-disc spacing. The present invention allows for much greater control of this critical dimension, i.e., height 226, than does the prior art example of FIG. 2.

Figure 8:
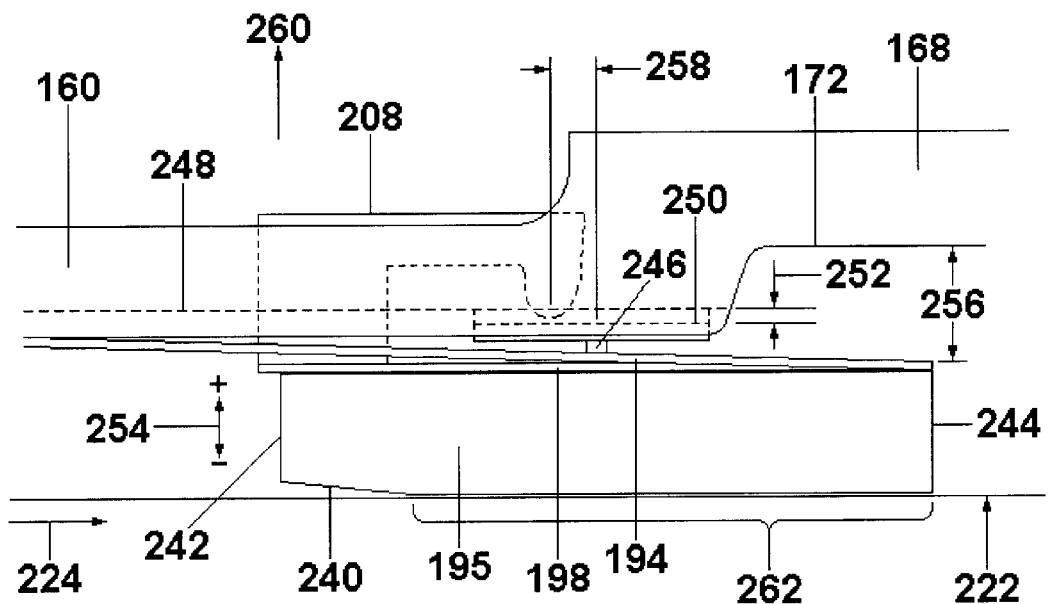
FIG. 8 is an extreme close up side elevation view of a portion of FIG. 6.

Other advantages of the head suspension of the present invention can best be seen in FIG. 8, which is a detail view of a portion of the elevation view of FIG. 6.

FIG. 8 shows the head assembly 195 mounted to the central tongue portion 198 of the gimbal member (190 in FIGS. 4, 5 and 6) in association with a disc surface 222, with the direction of disc rotation noted by arrow 224. As can be seen in the figure, the head assembly 195 includes a typical beveled portion 240 near its leading edge 242 to aid in establishing the air bearing between the head assembly 195 and the disc surface 222. As is also typical of head assemblies, it is envisioned that the transducer (not shown) used to write data to and retrieve data from the disc surface 222 is carried at or near the trailing edge 244 of the head assembly 195.

While the specific spatial relationships between configuration elements shown in FIG. 8 reflects the incorporation of a load point protrusion (164 in FIG. 3) made in accordance with the previously incorporated '234 patent, as will be discussed in detail below, the scope of the present invention is not envisioned as being limited to the particular form of mechanism which is used to transfer the load force to the head assembly 195, and the particular configuration shown in FIG. 8 should thus be considered as illustrative, rather than limiting.

In the example configuration of FIG. 8, and in accordance with the previously incorporated '234 patent, the load point protrusion portion (164 in FIG. 3) is first masked and etched to reduce the thickness of the load beam material to substantially one-half its original thickness, except in an area designated to form a load point protrusion 246, which retains the full material thickness. The half-etched region is then formed out-of-plane from the planar portion of the load beam 160, as shown by the vertical height difference between the upper surface 248 of the planar portion of the load beam 160 and the upper surface 250 of the load point protrusion portion. This height difference is also noted in the figure by arrows 252. The out-of-plane forming of the load point protrusion portion preferably is accomplished by the same stamping or forming operation used to bend and form the side rails (162 in FIG. 3), the bridging rails 168, the lift feature mounting portion 170 and ramp contact feature (174 in FIGS. 3 and 6).

As can be seen in the figure, the out-of-plane forming of the load point protrusion portion causes the load point protrusion 246 to extend below other elements of the load beam 160 and, when the load beam 160 is assembled to the gimbal (190 in FIGS. 4, 5 and 6), the load point protrusion contacts the central tongue element 198. This arrangement causes the gimbal beams 194 to be bent slightly away from the load beam 160, as shown in the figure. It will be appreciated by one of skill in the art that a similar configuration could be achieved by stamping a dimple in the load point protrusion portion instead of using the half-etching and forming operation described.

Another of the advantages of the present invention is also apparent in FIG. 8. It will be recalled from the previous discussions of FIGS. 4 and 5 that the present invention envisions that pitch static attitude adjustment of the gimbal 190 will be accomplished by clamping the gimbal beams 194, in the areas shown by dashed lines at 202 in FIGS. 4 and 5, with an appropriate fixture, and applying an adjustment force to the distal ends of the gimbal beams 194, as shown by arrows 206 in FIG. 4. FIG. 8 again shows the positive and negative pitch directions with arrows 254.

It will be apparent to one of skill in the art that increased positive pitch static attitude is readily achieved by bending the distal ends of the gimbal beams 194 downward, and that there is nothing in the structure of the head suspension to inhibit such bending.

Conversely, increasing negative pitch static attitude requires that the distal ends of the gimbal beams 194 be bent upward, and the configuration of the head suspension of the present invention facilitates such upward bending of the gimbal beams 194 by providing a relatively large vertical displacement between the distal ends of the gimbal beams 194 (and the connecting cross member 196 in FIG. 4) and the lower edge 172 of the bridging rails 168, as designated by arrows 256 in FIG. 8.

It should also be recalled from the discussion of the prior art head suspension of FIG. 2 that, while such negative static pitch attitude adjustment of the prior art head suspension was possible, positive pitch static attitude adjustment was limited by the presence of the lift displacement limiting features 154 beneath the gimbal beams 142.

The present invention thus has the advantage of facilitating pitch static attitude adjustment in both the positive and negative directions, a capability not present in the prior art head suspension of FIG. 2.

Finally, the head suspension of the present invention provides advantages over the prior art related to dynamic loading and unloading of the head assembly 195 into and out of cooperative engagement with the disc surface 222.

It will be installed from previous discussion that lifting the head assembly 195 away from the disc surface 222 via contact between a ramp structure and a cooperative ramp contact feature which is part of the load beam 160 tends to cause spatial separation between the load beam and gimbal portions of a head suspension, and that this tendency is exacerbated by incorporation of negative pressure air bearing configurations of the head assembly. Furthermore, if the amount of separation between the gimbal portion and load beam portion is not limited, plastic deformation of the delicate gimbal components can lead to fatal damage to the disc drive in which the head suspension is used.

FIG. 8 shows that the lift displacement limiting feature 208, formed at the proximal end of the central tongue element 198 of the gimbal portion, extends upward through the proximal opening (176 in FIG. 3) and longitudinally over the load point protrusion portion (164 in FIG. 3) to a position wherein the contacting element (not separately designated) of the lift displacement limiting feature 208 is slightly above the load point protrusion portion and longitudinally offset from the load point protrusion 246 in the proximal direction, as indicated by arrows 258. Thus, during normal disc drive operation, component relationships are as shown in the figure, and the lift displacement limiting feature 208 has no significant interaction with other head suspension components.

During head unloading operations, when the ramp contact feature (174 in FIGS. 3 and 6) contacts a cooperative ramp structure, a lifting force is applied to the load beam 160 in the direction of arrow 260. Since the head assembly 195 tends to remain in cooperative engagement with the disc surface 222, the lift force 260 acts to cause the gimbal beams 194 to bend further until such time as the lift displacement limiting feature 208 contacts the upper surface 250 of the load point protrusion portion of the load beam 160. When such contact occurs, the lifting force 260 is transferred through the lift displacement limiting feature 208 to the central tongue element 198 of the gimbal, and thence to the head assembly 195.

Since the contact point between the lift displacement limiting feature 208 and the load point protrusion portion of the load beam 160 is located longitudinally between the load point protrusion 246 and the leading edge 242 of the head assembly 195, the lifting force exerted through the lift displacement limiting feature 208 on the head assembly 195 tends to be concentrated towards the leading edge 242 of the head assembly 195, and thus acts to impart an increased positive pitch attitude moment to the head assembly 195. Imparting increased positive pitch attitude, or "nose-up" attitude, to the head assembly during head unloading serves to break the attraction between the head assembly 195 and the disc surface 222 in the area of the air bearing interface 262, further facilitating head unloading.

Similarly, during head loading, any tendency for the head assembly 195 to sag away from contact with the load point protrusion 246 is countered by the lift displacement limiting feature 208 contacting the upper surface 250 of the load point protrusion portion of the load beam 160, again imparting a positive pitch attitude to the head assembly 195, which will aid in establishing the desired air bearing between the head assembly 195 and the disc surface.

Finally, when it is recalled that both the ramp.contact feature (174 in FIGS. 3 and 6) and the lift displacement limiting feature 208 are substantially laterally centered on the overall head suspension assembly, it is apparent that the head suspension of the present invention permits dynamic loading and unloading of the head assembly 195 without imparting any undesirable lateral torque moments to the head assembly.

In summary, the head suspension of the present invention includes a load beam with a laterally centered ramp contact feature at its distal end and proximal and distal openings with a load point protrusion portion therebetween. The ramp contact feature is connected to the load beam by a lift feature mounting portion which provides additional features that allow great flexibility in determining the height at which the ramp contact feature lies above an associated disc surface. The head suspension is further made up of a gimbal with a mounting portion for attachment to the load beam, laterally opposed, longitudinally-extending gimbal beams with a connecting member between the distal ends thereof and a central tongue element, extending proximally from the connecting member, to which a head assembly is attached. The central tongue element further includes a lift displacement limiting feature laterally centered thereon which extends upward through the proximal opening in the load beam and longitudinally above the load point protrusion portion of the load beam. When the ramp contact feature of the load beam interacts with a cooperative ramp structure, the lifting force exerted on the ramp contact feature is transferred through the load beam to the lift displacement limiting feature, and thence to the attached head assembly, imparting a positive pitch attitude to the head assembly which facilitates head loading and unloading.

From the foregoing, it is apparent that the present invention is particularly well suited to provide the benefits set forth hereinabove as well as others inherent therein. While particular embodiments of the invention have been described herein, modifications to the embodiments that fall within the envisioned scope of the invention may suggest themselves to one of skill in the art who reads this disclosure. Therefore, the scope of the invention should be considered to be limited only by the following claims.

What is claimed is:

1. A head suspension for supporting a head assembly in cooperative engagement with a rotating disc in a disc drive which includes a ramp structure for dynamically loading the head assembly into cooperative engagement with the rotating disc and unloading the head assembly from cooperative engagement with the disc comprising:

a gimbal portion for mounting the head assembly and for providing compliance in roll and pitch axes of the head assembly, the gimbal portion further comprising:
  a pair of laterally disposed, longitudinally extending gimbal beams;
  a connecting cross member between distal ends of the gimbal beams;
  a central tongue element to which the head assembly is attached, extending proximally from the connecting cross member, and;
  a lift displacement limiting feature located at a proximal end of the central tongue element and extending upward away from the disc;
a load beam portion, fixedly attached to the gimbal portion, for exerting a load force on the head assembly to encourage the head assembly toward the disc, and comprising:
  proximal and distal openings and a load point protrusion portion disposed therebetween;
  bridging rails disposed laterally from the distal opening, and having proximal ends substantially laterally disposed in relationship to the load point protrusion portion and distal ends distally displaced therefrom;
  a lift feature mounting portion disposed between the distal ends of the bridging rails, and;
  a ramp contact feature extending distally from the ramp contact feature mounting portion along substantially a longitudinal centerline of the load beam portion
whereby, when the gimbal portion and load beam portion are fixedly attached, the lift displacement limiting feature extends through the proximal opening in the load beam portion and extends distally above the load point protrusion portion, and
whereby a positive pitch attitude is imparted to the head assembly during head loading and unloading operations.

2. A head suspension as claimed in claim 1, wherein the lift feature mounting portion further comprises connecting elements which extend laterally inward from the distal ends of the bridging rails to the ramp contact feature, the connecting elements being bent in relationship to the bridging rails at angles selectable to determine a vertical displacement between the ramp contact feature and the disc.

3. A head suspension as claimed in claim 1, wherein the bridging rails of the load beam portion overlie the connecting cross member of the gimbal portion, and wherein the bridging rails further comprise lower surfaces which are vertically displaced from the connecting cross member to facilitate negative pitch static attitude adjustment of the head assembly.

4. A head suspension as claimed in claim 1, wherein separation between the ramp contact feature and the disc is adjustable.

5. A head suspension as claimed in claim 1, wherein displacement of the head assembly relative to the head suspension during head loading and unloading operations.

6. A head suspension as claimed in claim 5, wherein the lift displacement limiting feature imparts a positive pitch attitude to the head assembly during head loading and unloading operations.

7. The head suspension of claim 1 wherein the lift displacement limiting feature is laterally centered on the central tongue element.

8. The head suspension of claim 1 wherein the lift displacement limiting feature is a single element.

* * * * *

UNITED STATES PATENT AND TRADEMARK OFFICE
CERTIFICATE OF CORRECTION

PATENT NO.    : 6,611,402 B1
DATED         : August 26, 2003
INVENTOR(S)   : Markus Erwin Mangold It is certified that error appears in the above-identified patent and that said Letters Patent is hereby corrected as shown below:

<u>Column 6,</u>
Lines 42 –47, delete entire paragraph and insert:

-- Systems of ramp structure and ramp contact features on head suspensions are described in co-pending United States Patent Applications Serial Number (SEA 8599), now U.S. Patent No. 6,201,666, issued March 13, 2001 and Serial Number 09/280,299, filed March 29, 1999, now U.S. Patent No. 6,157,520, issued December 5, 2000, both assigned to the assignee of the present application, and incorporated herein as if included in their entireties.

Signed and Sealed this

Twenty-first Day of September, 2004

JON W. DUDAS
*Director of the United States Patent and Trademark Office*